May 22, 1928.
E. H. SHAFF
1,670,318
GOVERNOR FOR PRESSURE FLUID OPERATED TOOLS
Filed March 9, 1925
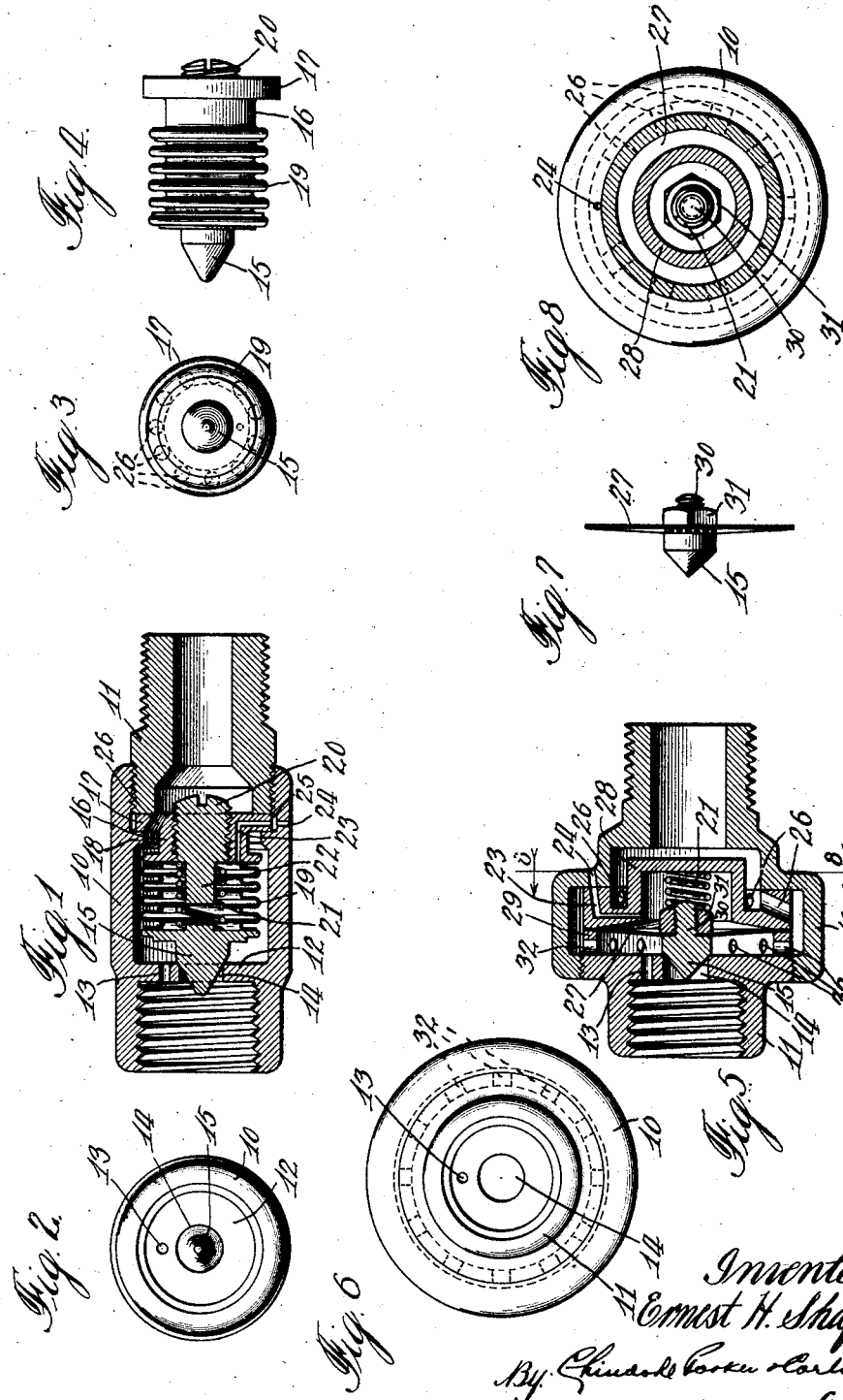

Patented May 22, 1928.

1,670,318

UNITED STATES PATENT OFFICE.

ERNEST H. SHAFF, OF GRAND HAVEN, MICHIGAN, ASSIGNOR TO WILLIAM H. KELLER, INC., OF GRAND HAVEN, MICHIGAN, A CORPORATION OF MICHIGAN.

GOVERNOR FOR PRESSURE-FLUID-OPERATED TOOLS.

Application filed March 9, 1925. Serial No. 14,029.

This invention relates to an automatic governor for pressure-fluid-operated tools such as pneumatic drills, grinders, and other motors or machines, and the general object of the invention is to provide a novel governor adapted to be connected in the pressure-fluid-supply conduit, and arranged so that it will automatically deliver variable quantities of the pressure fluid to actuate the tool, depending upon the conditions under which the tool is being operated.

Stated more specifically, it is an object of the invention to provide a governor which will deliver only a small quantity of pressure fluid to the tool when the latter is operating idly and which, when the tool is being used to perform its work, will deliver increasing quantities of the pressure fluid automatically as may be required to drive the tool under varying conditions of load thereon.

In pursuance of the foregoing objects the invention aims to provide an improved governor having a small idling air passage therethrough and also having a much larger passage which is controlled by a valve that is arranged to be automatically opened to varying degrees by the pressure fluid to permit increasing quantities of pressure fluid to pass through the governor in accordance with the requirements of the tool.

Further objects and advantages of the invention will be understood from the following detailed description, taken in connection with the accompanying drawings, in which Figure 1 is a longitudinal central section through one form of governor embodying the features of my invention.

Figs. 2 and 3 are end elevations of the governor looking respectively at the left and right hand ends of Fig. 1.

Fig. 4 is an elevation of the automatic valve device shown in Fig. 1.

Fig. 5 is a longitudinal central section through another form of governor embodying my invention.

Fig. 6 is an elevational view of the left hand end of the governor as seen in Fig. 5.

Fig. 7 is a detail view of the valve device shown in Fig. 5.

Fig. 8 is a transverse section in the plane of line 8—8 of Fig. 5 looking in the direction of the arrows.

While my invention is susceptible of embodiment in many different forms, I have shown in the drawings and will herein describe in detail two such embodiments, with the understanding that the present disclosure is to be considered as an exemplification of the principles of the invention and is not intended to limit the invention to the embodiments illustrated. The scope of the invention will be pointed out in the appended claims.

In the exemplary forms illustrated, the governor comprises a casing having its opposite ends threaded to adapt it to be coupled into the pressure fluid supply conduit. For brevity, I will hereinafter refer to this conduit as the air hose or air line, and to the pressure fluid as air. The casing has a transverse wall or partition provided with two openings therethrough, one being relatively small and the other relatively large, the latter preferably being centrally located. Passage of air through the smaller opening is in the present instance uncontrolled, that is to say, the air may pass freely from its source through this opening and through the governor as a whole to the tool to be operated. The larger opening is controlled by a valve carried by a pressure responsive device which is subjected to the pressure of the air and is arranged to yield when the differential pressures at opposite ends of the valve reaches a certain degree, the yielding of said device withdrawing the said valve from its opening to greater or less extent so as to admit the air through the said larger opening and allow it to pass through the governor to supply an increased quantity to the tool. The two forms of governor shown in the drawings differ mainly in the construction of the pressure responsive device referred to and in the shape and details of the cooperating parts to conform thereto.

Referring first to the construction shown in Figs. 1 to 4, the governor comprises a casing of generally tubular form composed of two alined sections 10 and 11 having threads at their opposite ends to receive complementary threaded elements on sections of the air hose which supplies the tool to be driven. The left hand end of the casing as viewed in the drawings is connected to the supply end of the hose, the right hand end being attached to the hose section leading to the tool. The casing sections are also threaded at their adjacent ends to fit one within the other as shown.

The casing has a transverse wall or partition 12 provided with a relatively small hole 13 therethrough and a relatively large hole 14 which is preferably located centrally in the casing.

The central hole 14 is normally closed by a conical valve member 15 carried by a pressure responsive device which is fixed within the casing. In the exemplary form shown this device comprises a head 16 having a radial circular flange 17 that is clamped between an annular internal shoulder 18 on the casing section 10 and the end of the other casing section 11. A tubular metallic bellows 19 is attached at one end to the head 16 and at its other end to a circular flange on the valve member 15, the connections between these parts being air tight. A screw 20 passes through and is threaded in the head 16, and a coiled compression spring 21 abuts at its opposite ends against said screw and the valve member 15, the spring being in the present instance held in central position by means of projections 22 on the screw and the valve member. This spring tends to hold the valve member to its seat, closing the hole 14, and the tension of the spring may be regulated by turning the screw 20.

The space within the pressure responsive device is maintained in constant communication with the atmosphere by a passage made up of an angular port 23 leading from one end face of the head and thence radially through the flange 17 thereof and a port 24 through the wall of the casing section 10. Preferably a space 25 is provided between the periphery of the flange 17 and the adjacent part of the casing so that the ports 23 and 24 need not be placed in exact register.

The head 16 also has an annular series of ports 26 which pass through its flange 17 and are open at all times, the body of the head and the bellows 19 being of less diameter than the adjacent internal dimensions of the casing so that air may flow freely around the bellows and the head and pass through the ports 26.

Referring now to the alternative construction illustrated in Figs. 5 to 8 of the drawings, similar reference characters are employed so far as practicable to designate parts corresponding to those already described, and a description of these parts need not be repeated. The pressure responsive device shown in Fig. 5 comprises a flexible diaphragm 27 and a chambered head 28 which are clamped at their peripheries between the casing section 10 and an annular flange 29 on the end of the casing section 11, as will be obvious from an inspection of Fig. 5. The valve member 15 is attached to the central portion of the diaphragm 27 by means of a stem 30 on the valve passing through a central aperture in the diaphragm and receiving a nut 31. The coiled compression spring 21 bears at its ends upon this nut and the end wall of the head, and tends to hold the valve 15 seated to close the central air passage or opening 14. The space enclosed by the diaphragm and the head 28 is maintained in constant communication with the autmosphere by ports 23 and 24 in a manner similar to that already described.

The flange 29 has an annular series of ports 32 therethrough which permit the free flow of air from either of the openings 13 and 14 to the annular space defined between the head 28 and the casing, and the head in turn has an annular series of ports 26 through its peripheral flange which maintain constant communication between the said annular space in the casing and the opposite end of the governor so as to permit a free passage of air therethrough.

The operation of both of the exemplary forms of the device is the same and is substantially as follows: When the tool being driven is idling, i. e., is not performing its work, it requires only a small quantity of air to run it and if the maximum amount of air be admitted to the tool it will race and thereby be damaged. It is therefore desirable when the tool is idling that only the necessary small quantity of air be admitted thereto. My governor accomplishes this purpose by maintaining the valve 15 seated when the tool is idling and allowing only a passage of such an amount of air as the small opening 13 will permit. When the tool is started in its work however, it will slow down and thereby build up a back pressure in the air hose between the governor and the tool and therefore within the governor at the right hand side of the valve. As a result, the higher back pressure at the outlet or right hand end of the governor will compress the bellows and unseat the valve and move it to the right to a greater or less extent, depending upon the amount of back pressure at the right hand side of the valve. This permits an increased flow of air through the governor to the tool. Due to the conical shape of the valve, the farther the valve moves to the right the greater is the amount of air which is permitted to pass through the opening 14.

It will thus be seen that the governor is automatic in its operation and conforms to the power requirements of the tool, and that it prevents racing of the tool when idling.

I claim as my invention:

1. A governor of the character described comprising, in combination, a casing comprising two sections connected by screw thread means, a hollow pressure responsive device located within the casing and clamped between said sections, said device having a yieldable wall, means establishing constant communication between the interior of said device and the atmosphere, a valve mounted on said yieldable wall, a pressure fluid passage extending through the entire casing in axial alinement therewith controlled by said valve, means tending to maintain said device expanded with said valve closing said passage, and means providing another constantly open passage through the casing.

2. A governor of the character described having, in combination, a casing comprising two axially alined sections having a screw thread connection and providing an inlet and an outlet at their opposite ends and a unitary hollow valve device mounted in said casing having an apertured peripheral flange which is clamped between said casing sections.

3. A governor of the character described comprising, in combination, a casing having two alined tubular sections in screw threaded inter-engagement, a transverse wall in one of said sections having a central port, a valve adapted to control said port, a support for said valve comprising a head having an annular flange clamped between the adjacent ends of said casing sections and a hollow compressible metallic device disposed between said head and said valve, and means to exhaust the interior of said compressible device comprising a port in said head and a port in one of said casing sections connected together by an annular port formed between the casing and the head.

4. A governor of the character described having, in combination, a casing comprising two aligned tubular sections screw threaded together, a transverse wall in one of said sections having an aperture therethrough defining a portion of a passage through said casing, a valve adapted to control said aperture, a mounting for said valve comprising a hollow compressible metallic device and a head having a radial projection clamped between the adjacent ends of said casing sections, and means to exhaust the interior of said hollow device comprising a port extending through said radial projection and said casing.

In testimony whereof, I have hereunto affixed my signature.

ERNEST H. SHAFF.